United States Patent
Gieras et al.

(10) Patent No.: US 8,085,003 B2
(45) Date of Patent: Dec. 27, 2011

(54) VOLTAGE REGULATED PERMANENT MAGNET GENERATOR

(75) Inventors: Jacek F. Gieras, Glastonbury, CT (US);
Gregory I. Rozman, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 441 days.

(21) Appl. No.: 12/355,864

(22) Filed: Jan. 19, 2009

(65) Prior Publication Data
US 2010/0181969 A1  Jul. 22, 2010

(51) Int. Cl.
*H02P 9/40* (2006.01)
*H02P 9/14* (2006.01)

(52) U.S. Cl. ............... 322/49; 322/50; 322/52; 310/190

(58) Field of Classification Search ............... 322/44–46, 322/49, 52, 57, 59; 310/190
See application file for complete search history.

(56) References Cited

U.S. PATENT DOCUMENTS

| | | | |
|---|---|---|---|
| 549,644 A * | 11/1895 | Ide | 322/63 |
| 607,125 A * | 7/1898 | Negbaur et al. | 322/49 |
| 656,127 A * | 8/1900 | Spence | 310/190 |
| 925,499 A * | 6/1909 | Parsons et al. | 322/50 |
| 2,564,320 A * | 8/1951 | Brainard | 322/28 |
| 3,396,325 A * | 8/1968 | Hopkins | 322/46 |
| 4,025,840 A | 5/1977 | Brissey et al. | |
| 4,663,581 A | 5/1987 | Glennon | |
| 4,663,582 A * | 5/1987 | Fujii et al. | 322/63 |
| 5,260,642 A | 11/1993 | Huss | |
| 5,714,823 A | 2/1998 | Shervington et al. | |
| 6,700,242 B2 | 3/2004 | Kawamura | |
| 6,965,183 B2 | 11/2005 | Dooley | |
| 7,262,521 B2 | 8/2007 | Dooley et al. | |
| 7,288,923 B1 | 10/2007 | Dooley et al. | |
| 8,008,896 B2 * | 8/2011 | Nakada et al. | 322/75 |
| 2006/0226721 A1 | 10/2006 | Dooley et al. | |
| 2007/0024249 A1 | 2/2007 | Dooley | |

FOREIGN PATENT DOCUMENTS

DE  4004306  * 9/1990
JP  10-336981  * 12/1998

* cited by examiner

*Primary Examiner* — Burton Mullins
(74) *Attorney, Agent, or Firm* — Carlson, Gaskey & Olds, PC

(57) ABSTRACT

A single phase AC generator uses a rotor contained within a stator. The stator has an armature winding and a control winding which is capable of having its magnetic permeability adjusted, thereby limiting the output voltage of the armature winding. The stator additionally has two core sections.

14 Claims, 3 Drawing Sheets

VOLTAGE REGULATED PERMANENT MAGNET GENERATOR

BACKGROUND OF THE INVENTION

The present disclosure is directed toward a single phase alternating current (AC) permanent magnet generator having voltage regulation.

Vehicles, such as aircraft, typically employ multiple components which require electrical power to operate. Modern aircraft also contain generators which are capable of utilizing rotational energy from an aircraft turbine engine to turn a rotor and generate electricity. The rotor speed of the generator is a function of the turbine speed of the turbine engine and cannot be adjusted without adjusting the speed of the turbine engine. An aircraft electrical system will also typically have components that will be damaged unless voltages are maintained within a certain range. In order to meet the voltage limits of the electrical system, most aircraft have utilized voltage regulated generators to generate onboard power that does not exceed the voltage limits.

Voltage regulated generators used in the art typically comprise a standard single or poly phase AC generator, with an additional controller capable of controlling the voltage. The additional controller monitors the voltage output of the generator using any number of known ways, and maintains the voltage output within a desired specification.

Since onboard generators draw power from the rotational energy of the turbine engine and the turbine engine speed necessarily changes during operation, the generators are required to encompass a way of controlling the voltage output of the generator without controlling the physical rotation speed of the rotor. Additionally, the voltage output of the generator will be dependent on the load. Since varied loads can be applied to a single generator it is required to control the voltage output of the generator.

Previous methods for controlling a generator output voltage have included utilizing magnetic shims in the rotor which physically shift at high rotational speeds, thereby affecting the electromagnetic field of the armature winding, using a complex winding having multiple winding sections where certain winding sections are only activated at a given rotor speed range, saturating an armature winding with DC current, or housing the stator within the rotor and providing complex control and armature windings. Each of these methods is complex and difficult to assemble, thereby increasing the cost of the generator as well as increasing the necessary maintenance.

SUMMARY OF THE INVENTION

Disclosed is a permanent magnet voltage regulated generator having an armature winding, a control winding acting as a magnetic flux diverter which is capable of limiting an output voltage of the armature winding, a stator, and a rotor. The stator is exterior to the rotor, and has two core sections, each of which has either an I or a C shaped core.

These and other features of the present invention can be best understood from the following specification and drawings, the following of which is a brief description.

DETAILED DESCRIPTION OF THE PREFERRED EMBODIMENT

Figure 1:
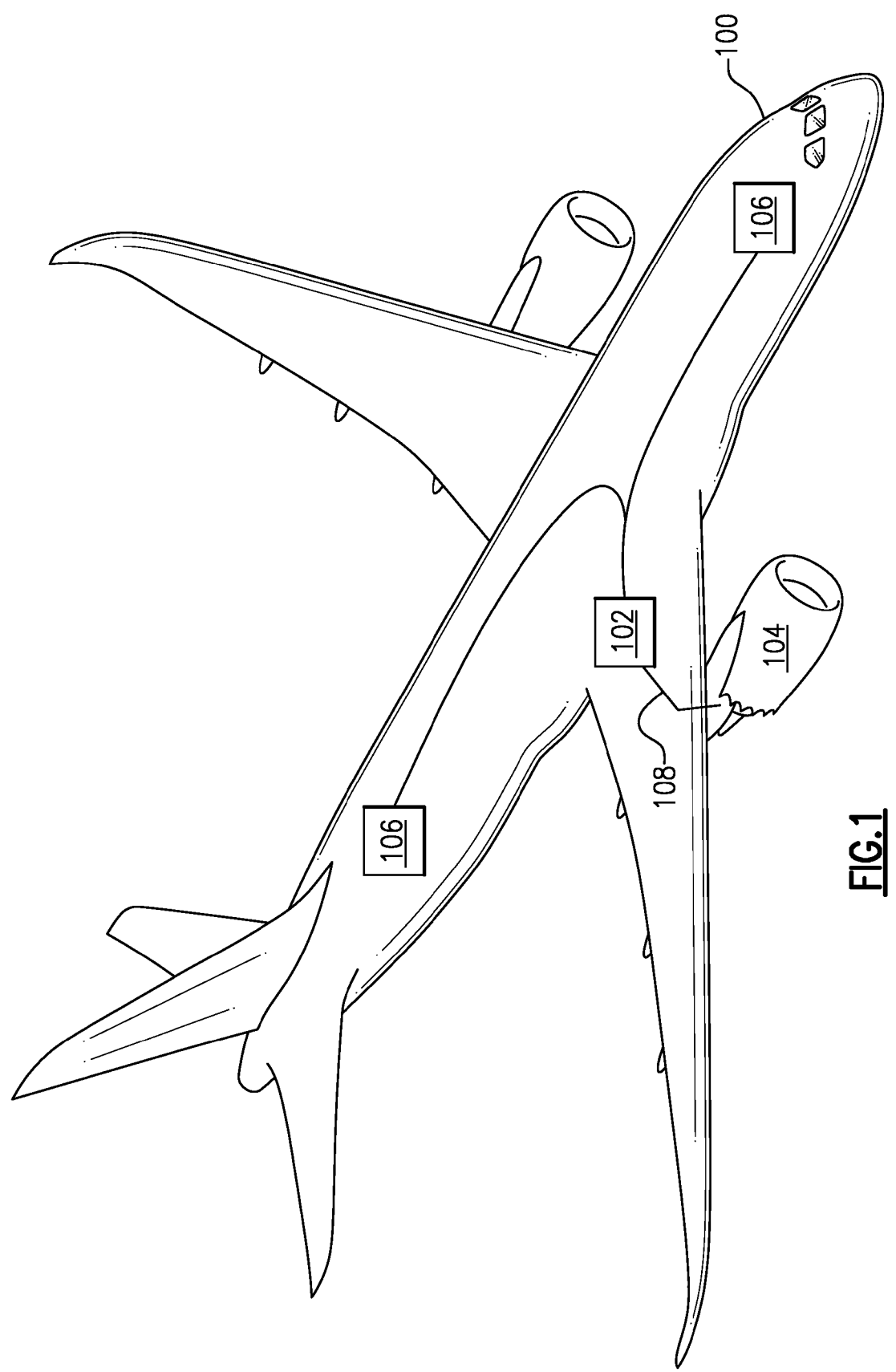
FIG. 1 illustrates an example aircraft using a permanent magnet generator according to the present application.

FIG. 1 illustrates an aircraft 100 that utilizes turbine engines 104 to generate thrust. The turbine engines 104 contain a mechanical connection to a single phase generator 102, shown schematically in FIGS. 2-4, which transfers rotational power from a turbine in the turbine engine 104 to a rotor within the single phase generator 102. The mechanical connection allows the rotor to turn at the same speed as the turbine engine 104 or at a speed proportional to the speed of the turbine engine 104, depending on the mechanical connection. The rotation of the rotor generates a magnetic flux which travels through a stator in the single phase generator 102. The magnetic flux passes by an armature winding, thereby causing an electrical current in the armature winding. The armature winding is connected to the aircraft electrical system, and outputs an electrical current to the rest of the system. Electric current produced by the armature winding is passed to other electronic systems 106 within the airplane 100 in order to either power electrical components or undergo further processing. A similar system could be used in any other type of generator, such as one powered by a land based turbine engine, and this disclosure extends to other applications as well.

Certain applications require power from the generator 102 to remain within a voltage range in order to operate properly. Since the voltage output of the generator is dependent on the turbine engine 104 speed and generator load, and the turbine engine 104 speed cannot be adjusted for power generation concerns, nor can the load be adjusted once connected, it is necessary to develop an alternate way to control the voltage generated by the generator 102.

Figure 2:
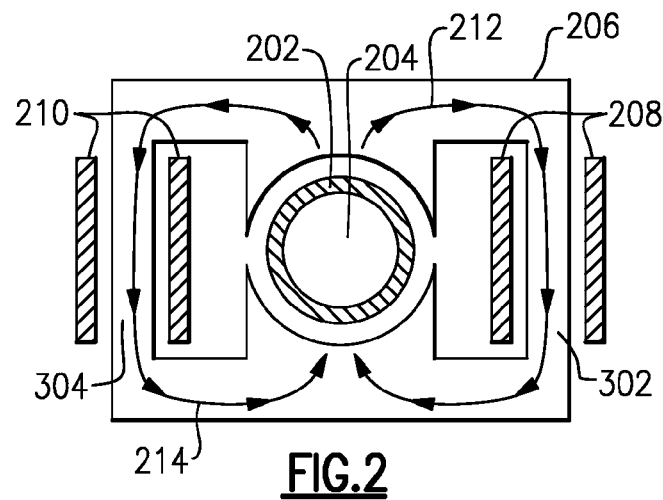
FIG. 2 illustrates a first example single phase permanent magnet generator having a control winding.

FIG. 2 illustrates a single phase permanent magnet generator design capable of controlling a generator voltage output without limiting a rotor 202 speed. The rotor 202 is connected to a shaft 204 which can be mechanically coupled to an aircraft turbine engine, or to any other means of mechanical rotation. The generator has a stator 206 with an armature winding 208 and a control winding 210. In the example of FIG. 2 the control winding 210, and the armature winding 208 are located on opposite sides of the rotor 202.

The stator 206 surrounds the rotor 202, and can be constructed out of a single piece of ferromagnetic material or multiple pieces bonded together. The stator 206 additionally has two core sections 302, 304 about which the armature winding 208, and the control winding 206 are wound. Each core section 302, 304 has a stem portion 312, 316 with protrusions 314, 318 extending laterally away from the top and bottom ends of the stem 312, 316. A core section in which the protrusions 314 extend in one direction away from the stem 312 is referred to as a "C shaped" core (see FIG. 4), whereas a core section where the protrusions 318 extend two directions away from the stem 316 is referred to as an "I shaped" core (see FIG. 3). Both core sections 302, 304 illustrated in FIG. 2 utilize C shaped cores.

In the absence of a control winding 210, the rotation of the rotor 202 will create a magnetic flux which flows according to flux flow path 212, illustrated in FIG. 2. By introducing the control winding 210 into the permanent magnet generator, an alternate flux flow path 214 is created. The alternate flux flow path 214 siphons a portion of the magnetic flux from the flux flow path 212, thereby limiting the magnetic flux flowing through the armature winding 208.

The amount of magnetic flux that can travel through the alternate flux flow path 214 is dependent on the magnetic permeability of the control winding 210. When the magnetic permeability is high, a large amount of magnetic flux can flow through the alternate flux flow path 214, and when the magnetic permeability is low, only a small amount of magnetic flux can flow through the alternate flux flow path 214. Additionally, the greater the amount of magnetic flux which flows through the armature windings 208, the larger the power output of the armature windings 208 will be.

The magnetic permeability of the core about which control winding 210 is wound is dependent on a control current traveling through the control winding 210 in an inverse proportional relationship. As the amount of current sent through the control winding 210 increases, the magnetic permeability of the core about which control winding 210 is wound decreases. The magnetic permeability of the control winding 210 can therefore be controlled by sending appropriate levels of DC current through the control winding. The DC control current can be generated using any known means and controlled using a generator controller.

Controlling the permeability of the core about which control winding 210 is wound also controls the quantity of magnetic flux traveling through the armature winding 208, as described above, thereby controlling the output power of the armature winding 208. Accordingly, when a high control current is sent through the control winding 210 the output power of the armature winding 208 will be virtually unrestricted, as the magnetic flux flowing through the alternate magnetic flux flow path 214 will be negligible. However, when a low current is sent through the control winding 210, a large portion of the magnetic flux will travel through the control winding 210, instead of the armature winding 208, resulting in a limited voltage output of the armature winding 208.

Figure 3:
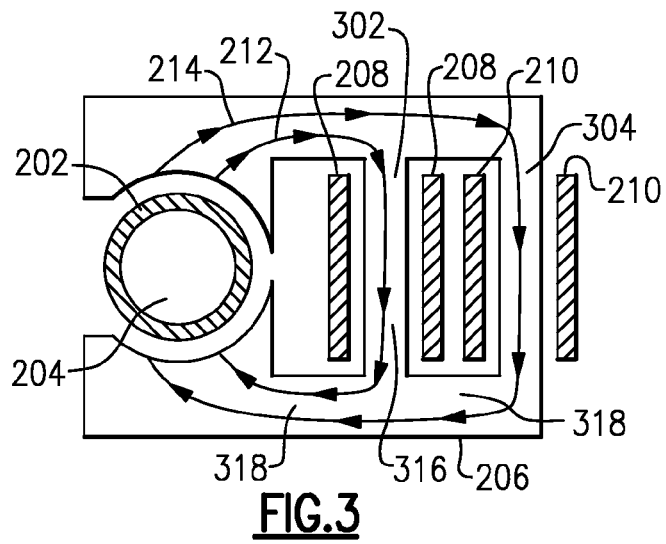
FIG. 3 illustrates a second example single phase permanent magnet generator having a control winding.

In FIG. 3, the control winding 210 is placed adjacent to the armature winding 208 instead of opposite the armature winding 208 as in FIG. 2. Due to placing the control winding 210 adjacent to the armature winding 208, the stator 206 does not need to completely surround the rotor, however the stator 206 circumferentially encircles greater than 50% of the rotor. The principle of operation for FIG. 3 is identical to the operation of FIG. 2, having a primary magnetic flux flow path 212, and an alternate magnetic flux flow path 214. Like FIG. 2, FIG. 3 additionally has two core sections 302, 304 built into the stator. In FIG. 3, however, the armature winding core section 302 uses an I shaped core and the control winding core section 304 uses a C shaped core. Determining which of FIG. 2 or 3 to use in a particular application is a design decision, and can be made based on factors independent of power generation concerns, such as space or weight constraints.

In order to implement active voltage regulation control within the generator 102, a controller can be used which transmits a control current to the control windings 210, and determines a necessary control current volume based on measurements corresponding to the rotor 202 speed. In the examples of FIGS. 2 and 3 an external controller can be connected to the generator 102 and can perform the same controlling operation described below for the example of FIG. 4. Alternately a single phase permanent magnet generator 400 may include a controller 402 in its construction. An example of such a configuration is illustrated in FIG. 4.

Figure 4:
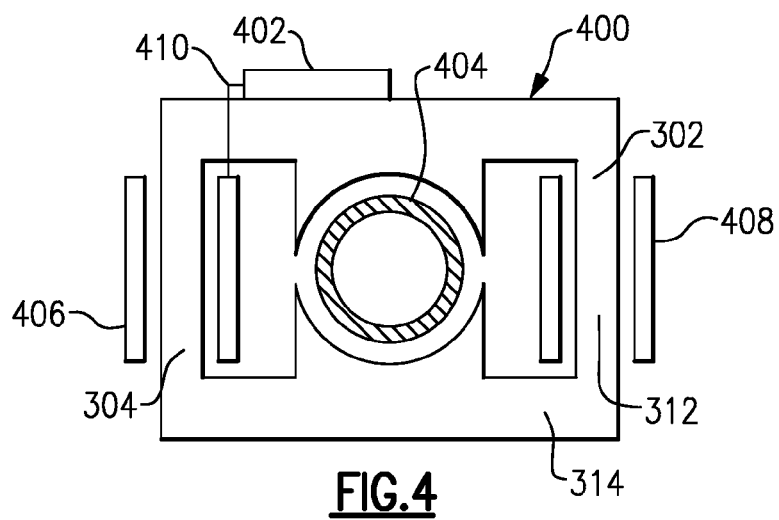
FIG. 4 illustrates an example single phase permanent magnet generator including a simple control winding and a controller.

The controller 402 of FIG. 4 is configured to receive a measurement corresponding to the rotational speed of rotor 404. The controller 402 can then determine, based on the rotor 404 speed, an appropriate level of magnetic permeability for a control winding 406 thereby limiting the amount of voltage output of an armature winding 408 to a desired level. Once the required level of magnetic permeability is determined, the controller 402 can output a current to the control winding 406, using a control current line 410, or, alternatively, instruct another component to output an appropriate current. Alternate rotor configurations can be designed to accept armature winding 408 voltage measurements, or any other measurement indicative of the rotor 404 speed and still perform the above described function.

Figure 5:
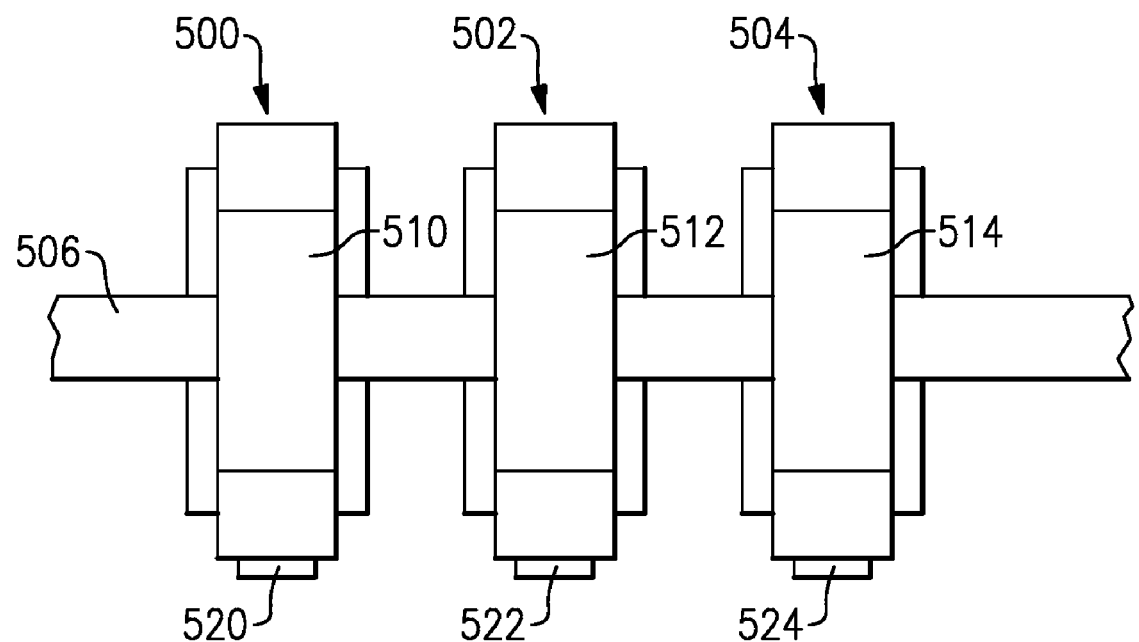
FIG. 5 illustrates a group of single phase permanent magnet generators arranged to provide balanced three phase power.

While FIGS. 2, 3, and 4 illustrate a single phase permanent magnet generator, it is known that a three phase generation system can be created using three single phase permanent magnet generators 500, 502, 504. FIG. 5 illustrates a three phase system employing three single phase generators 500, 502, 504, each constructed according to the above disclosure. In three phase systems each of the generators 500, 502, 504 is connected to a single rotating shaft 506, and, therefore, the rotors 510, 512, 514 contained in each generator 500, 502, 504 rotate at the same speed. Each generator 500, 502, 504 could have a generator controller 520, 522, 524 capable of adjusting a current in the control windings contained within the generator 500, 502, 504. Alternately, a single external controller could control all three generator control windings simultaneously.

In order for each of the three generators 500, 502, 504 to produce a different phase, the generators 500, 502, 504 are mounted such that magnets contained within the rotors are offset rotationally about the shaft 506 from each adjacent generator 500, 502, 504 by 120 degrees. The offset results in power being generated in three balanced phases suitable for use with a three phase system. A similar method could be used to create a two phase system, or to create any number of other phases. In the case of a different number of phases the rotational offset of each phase from its adjacent phases should be equal to 360 degrees divided by the number of phases.

Figure 6A:
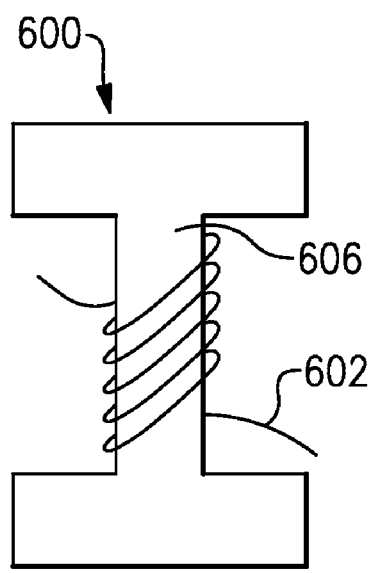
FIG. 6A illustrates an "I" shaped stator core having a simple winding.
Figure 6B:
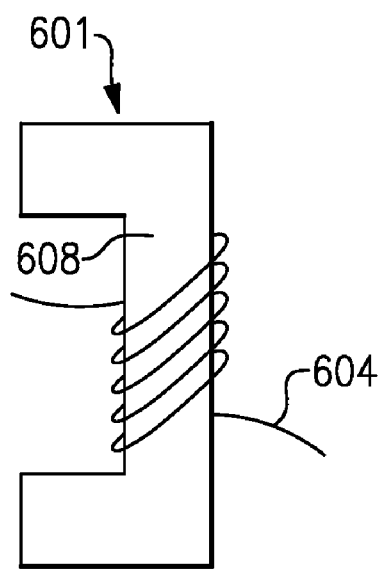
FIG. 6B illustrates a "C" shaped stator core having a simple winding.

Although many types of electrical windings are known in the art, the examples of FIGS. 2, 3, and 4 utilize a winding type known as a simple winding. FIGS. 6A and 6B illustrate an I shaped (FIG. 6A) and a C shaped (FIG. 6B) stator core. A simple winding is a single wire 602, 604 wound around a stem portion 606, 608 of an I shaped core 600 or a C shaped core 601. The core 600, 601 of a simple winding can be an independent component which is connectable to the stator, or the core can be a component of the stator about which the winding 602, 604 is wound.

The windings 602, 604 in the examples of FIGS. 2, 3, 4, and 6 are referred to as simple windings because they utilize a single wire 602, 604 which is wound around the stem 606, 608 without using any complicated turns such as would be used in a figure eight winding or a toroidal winding. Simple windings are relatively easy to construct, resulting in cheaper and faster manufacturing. In FIGS. 2, 3, and 4 the winding core comprises portions of the stator 206. Methods for determining the number of times a wire 602, 604 should be wound for creating an armature winding or for a control winding are known in the art. Additional embodiments could be constructed utilizing more complex winding designs and still fall within the above disclosure.

Although multiple embodiments of this invention have been disclosed, a worker of ordinary skill in this art would recognize that certain modifications would come within the scope of this invention. For that reason, the following claims should be studied to determine the true scope and content of this invention.

What is claimed is:

1. A single phase permanent magnet voltage regulated generator comprising:
   a rotor;
   a stator exterior to said rotor, wherein said stator comprises a stator body and two core sections, wherein a winding is wound about each of said core sections;
   each of said core sections having a stem defining an axis about which a winding is wound and two protrusions protruding from the ends of said stem, wherein said protrusions protrude laterally away from said axis;
   an armature winding on a first of said two core sections;
   a control winding on a second of said two core sections;
   a controller, operable to accept a value representative of a rotor speed and determine a desired magnetic permeability of said control winding based on said value, and operable to induce a current in said control winding, thereby altering a magnetic permeability of an alternate magnetic flux flow path
   wherein said control winding is operable to act as a magnetic flux diverter, and thereby regulate an output voltage of said armature winding;
   wherein said control winding is operable to provide said alternate magnetic flux flow path thereby affecting an induced electromagnetic field of said armature winding; and
   wherein said armature and said control windings are stator windings.

2. The device of claim 1, wherein said stator entirely surrounds said rotor.

3. The device of claim 1, wherein said control winding and said armature winding are configured such that an electrical output of said armature winding decreases as said current in said control winding increases.

4. The device of claim 1, wherein said control winding and said armature winding are independent simple windings, and wherein said independent simple windings comprise a single wire wound uni-directionally around a respective stator core.

5. The device of claim 1, wherein a magnetic flux permeability of a core about which the control winding is wound is dependent on an amount of a control current flowing through the control winding.

6. The device of claim 5, wherein said control winding is configured in such a way that as the control current is increased, the magnetic permeability of the core is decreased.

7. The device of claim 1, wherein said armature winding is capable of outputting alternating current power.

8. The device of claim 1, wherein said armature winding and said control winding are immediately adjacent.

9. The device of claim 1, wherein said rotor is located between said armature winding and said control winding.

10. The device of claim 1, wherein at least one of said two core sections comprises a C shaped core section.

11. The device of claim 1, wherein at least one of said two core sections comprises an I shaped core section.

12. The device of claim 1, wherein said stator circumferentially encircles greater than 50% of said rotor.

13. The device of claim 1, wherein each of said core sections has a stem defining an axis about which a winding is wound and two protrusions extending from the ends of said stem.

14. The device of claim 13, wherein said protrusions extend laterally away from said axis.

* * * * *